Oct. 30, 1962  C. J. KOESTER  3,060,808
ACHROMATIC POLARIZATION ROTATORS
Filed Aug. 1, 1958  3 Sheets-Sheet 1

INVENTOR
Charles J. Koester
BY
Blair Spencer + Buckles
ATTORNEYS

Oct. 30, 1962 C. J. KOESTER 3,060,808
ACHROMATIC POLARIZATION ROTATORS
Filed Aug. 1, 1958 3 Sheets-Sheet 2

INVENTOR
Charles J. Koester
BY
Blair, Spencer + Buckles
ATTORNEYS

United States Patent Office 3,060,808
Patented Oct. 30, 1962

3,060,803
ACHROMATIC POLARIZATION ROTATORS
Charles J. Koester, Southbridge, Mass., assignor to American Optical Company, Southbridge, Mass., a voluntary association of Massachusetts
Filed Aug. 1, 1958, Ser. No. 752,479
18 Claims. (Cl. 88—65)

This invention relates to devices for rotating the plane of polarization of polarized light, and more specifically to such devices which are effective for more than one light wavelength and for a variety of predetermined angles of rotation of the plane of polarization.

Polarized light rotating devices, hereinafter called rotators, are an essential element in various optical instruments. In many interference microscopes, for example, a beam of plane polarized light is split into two normally polarized component beams, one of which is passed through the substantially transparent specimen or object. The phase retardation of this beam by the object can be measured only if the two beams are recombined, and the splitting and recombining is achieved by passing the beams through plates of birefringent material, such as calcite, which has different refractive properties for light passing through it polarized in different planes. Both of these beams must be rotated 90° between these birefringent elements in order to produce the desired recombination.

Polarized light rotators of the conventional half-wave plate type are known to be effective for only the single light wavelength for which they provide precisely one-half wavelength phase retardation. For light of other wavelengths, these prior art rotators are much less effective in that such light will not be plane polarized at the desired azimuth angle. Accordingly for wavelengths of light different from the single wavelength rotated, the intensity of emerging light vibrating in the plane normal to the desired plane of polarization reaches substantial amounts. Conventional rotators are therefore useful only with monochromatic light, and this severely limits the usefulness of optical instruments employing these conventional rotators. Specimens which absorb this single light wavelength cannot be examined in such apparatus; ambiguous specimen thickness determinations cannot be resolved; in addition, such rotators have only a narrow acceptance angle for incident light.

I have discovered that economical and useful rotators may be made, incorporating a plurality of properly oriented light-modifying means preferably in the form of wave plates. My rotators are effective for a plurality of light wavelengths, and such rotators will rotate white light much more effectively than conventional rotators, thus solving the problems presented by the monochromatic light requirement of the conventional rotators.

The present invention makes possible the use of polychromatic or white light with the aforementioned optical apparatus, solving the above-stated problems and achieving many desired improvements and advantages, as more fully described below.

Achromatic wave-plates employing superimposed sheets with necessarily different dispersions of birefringence are known and have been used heretofore in the art. By means of these techniques achromatic half-wave plates could be constructed which could then be used to rotate the plane of polarization by a predetermined amount for two wavelengths. The different dispersions of birefringence and the thicknesses of such sheets must be carefully selected within strict tolerances. The present invention, however, has advantages over these earlier devices in that the same birefringent material is preferably used in each of the components, and also the exact optical thickness of the plates is not critical so long as the optical thickness of each plate is substantially the same. Also, in the present invention increasingly better achromatization can be obtained by increasing the number of components oriented at the proper angles, thus making three-, four-, and five-element rotators.

A major object of this invention is to provide rotators for plane polarized polychromatic light, including not only visible light, but also light in the infrared and ultraviolet regions of the optical spectrum as well, which are far more effective over a range of wavelengths than the conventional monochromatic half-wave plate rotator.

Another object of the invention is to provide rotators of the above character for polarized light which are completely effective rotators for a plurality of light wavelengths.

A further object of the invention is to provide rotators of the above character effective for a plurality of light wavelengths and capable of rotating a beam of plane polarized light over a variety of different and predetermined angles.

A further object of the invention is to provide rotators of the above character which are effective over a larger angular aperture than are simple single half-wave plate rotators.

An additional object of the invention is to provide rotators of the above character particularly adapted for use in interference mircroscopes.

Still another object of the invention is to provide rotators of the above character for interference microscopes adapted to rotate a plurality of light wavelengths in order to eliminate uncertainty in the measurement of specimen thickness.

A further object of the invention is to provide rotators of the above character for interference microscopes which are useful in measuring the thickness or optical qualities of specimens of materials which absorb light of one or more wavelengths.

Another object of the invention is to provide rotators of the above character adapted for use in interference microscopes for measurements requiring polarized light of a plurality of wavelengths.

Still another object of the invention is to provide rotators of the above character adapted for use in Laurent half-shade devices employed in the polarizer of a polarimeter, saccharimeter, or other polarizing instrument.

Still another object of the invention is to provide rotators of the above character adapted for use in wide angle compensators.

An additional object of the invention is to provide rotators of the above character adapted for use in a Martens photometer. Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

A brief summary of the optical phenomena associated with polarized light is helpful in explaining the operation of the present invention.

A ray of ordinary unpolarized light may be regarded as composed of waves vibrating in an infinite number of different planes normal to the direction of the ray, and the color and wavelength of the light depend upon the frequency of these vibrations. White light may be regarded as containing light of all wavelengths of the visible spectrum, while monochromatic light has a single wavelength, and polychromatic light contains a plurality of different wavelengths.

When a ray of unpolarized light is passed through a polarizer, such as a Nicol prism, a Glan-Thompson prism, or a sheet of transparent polarizing material, the transmitted light is called "plane polarized" light, because only that portion of the light vibrating in a single plane normal to the direction of the ray is passed by the polarizer, while the remaining portions of the light are blocked.

The known device for rotating plane polarized light by 90° is a single "half-wave" plate of birefringent material, such as calcite, mica, quartz, transparent molecularly-oriented plastic materials, etc. Such materials are "anisotropic," i.e., the optical properties depend on the angular direction at which the light travels through the crystal. In general, light of a given polarization travels through the crystal at a different velocity than light polarized perpendicularly thereto. In an uniaxial crystal there is one direction along which light of all polarizations travels with the same velocity. This direction is called the optic axis. In biaxial crystals such as mica there are two such directions, and therefore two optic axes.

When a plane parallel plate is cut from a uniaxial material, for light incident normally on the plate, there is always one vibration direction which is perpendicular to the optic axis. This direction is then known as the "fast" axis if the crystal has positive birefringence. Perpendicular to this direction is the slow axis of the plate. If the crystal has negative birefringence, these axes are reversed. Similarly a plate cut from a biaxial crystal will have a fast and a slow axis. With such plane parallel plates it is convenient to speak merely of the fast and slow axes, or the "principal axes," thus avoiding the use of the terms uniaxial, biaxial, positive birefringence and negative birefringence.

Furthermore, if the optic axis of a uniaxial crystal is not parallel or perpendicular to the direction of light through the crystal, then light travelling through the crystal is separated into two beams—the ordinary and the extraordinary beams—which vibrate in directions perpendicular to each other, and which not only travel at different velocities through the crystal, but also follow different paths. For a discussion of these phenomena, see Frocht, "Photoelasticity" (Wiley, 1941), vol. 1, pp. 103–116.

If a ray of plane polarized light is directed onto such birefringent material with its incident plane of polarization oriented at an angle of about 45° to the two normal principal axes, the beam may be regarded as divided into two components, each being polarized in a plane parallel to one of the principal axes, and one component will pass through the material more slowly than the other. When the material is a "half-wave" plate, i.e., a plate having a chosen thickness such that the relative retardation of this slower component is equal to one-half of the wavelength of the light, this has the effect of changing or "rotating" the plane of polarization of the emerging light by 90° with respect to the incident plane of polarization.

Such prior art 90° rotators are effective only for the single wavelength $\lambda_0$ for which they provide retardation of exactly one-half wavelength. The amount of phase retardation is dependent upon the wavelength, and for wavelengths different from $\lambda_0$, 90° rotation is not complete, as shown by curve B in FIGURE 2, because the retardation is not equal to one-half wave-length. The function $\phi(\lambda)$ which determines the retardation at other wavelengths will be governed partly by the thickness of the plate and partly by the dispersion of birefringence. Birefringent materials are so-called because they exhibit a different index of refraction for light beams or components thereof polarized in different planes, producing the two differently-refracted rays, the ordinary ray and the extraordinary ray (Frocht, op. cit., at pp. 103–108). Birefringence is defined as the difference between the index for the extraordinary ray and the index for the ordinary ray. The dispersion of birefringence is a measure of the amount this quantity changes with variation in wavelength.

When plane polarized light is passed through a plate of such birefringent material which is just thick enough to retard one component by one-quarter wavelength, i.e., a so-called "quarter-wave plate," the emerging light is circularly polarized if the incident plane of polarization is inclined at an angle of 45° to the principal axes of the plate. For other incident angles of inclination, the emerging light is polarized elliptically, although if the incident plane of polarization coincides with one of the principal axes, the polarization of the emerging light is unaffected.

For an extended discussion of these various phenomena, see Frocht, op. cit., pp. 101–124.

Figure 1:
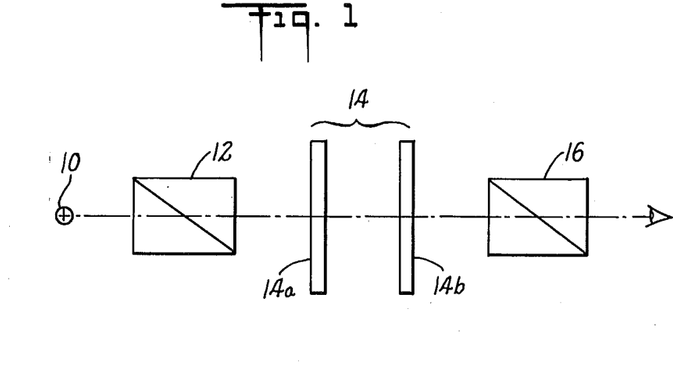
FIGURE 1 is a diagram of a basic optical system illustrating the operation of one embodiment of my invention.

A basic system which serves to demonstrate the usefulness of one form of my rotator is shown in FIGURE 1, where a source 10 produces a beam of light which is passed through polarizer 12, shown schematically as a Glan-Thompson prism, which plane-polarizes the beam. The system also includes an analyzer 16, shown as another Glan-Thompson prism, for determining the plane of polarization of the light emerging from the rotator. This form of my rotator 14 includes two substantially optically identical wave plates 14a and 14b, interposed between polarizer 12 and analyzer 16 and properly oriented as described below. These plates preferably provide a half-wavelength retardation for a wavelength $\lambda_0$ at or near the center of the spectral region of interest.

My rotator has the effect of rotating the plane of polarization by the angle $\alpha$, which may be chosen to be 90° as in the conventional rotator, as will be more fully discussed below. This angular difference $\alpha$ between the incident and emergent planes of polarization may be measured by rotating the analyzer and observing the inclination corresponding to minimum brightness.

Figure 2:
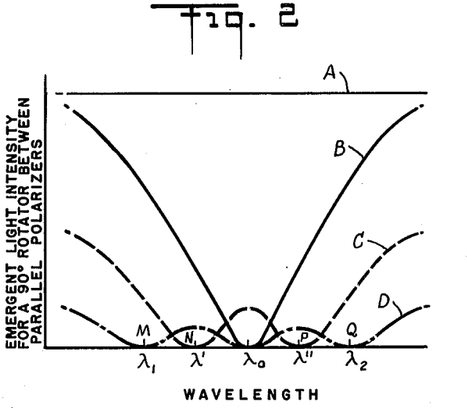
FIGURE 2 is a group of curves showing qualitatively the effectiveness of my polarization rotator.

The effectiveness of the 90° rotators of the present invention can be seen qualitatively in FIGURE 2, where the ordinate represents the intensity of the emergent beam measured in the incident plane of polarization, i.e., after passage through the system shown in FIGURE 1 in which polarizer 12 and analyzer 16 have their polarization planes parallel, while the abscissa represents increasing wavelengths of light passed through my rotator. Line A represents the intensity of the incident beam of polychromatic light, which has a constant ordinate value for all wavelengths along the abscissa. With a prior art rotator employing a single half-wave plate, rotation is complete and emergent intensity zero in the incident plane only for the specific wavelength $\lambda_0$ for which the half-wave plate is designed, as shown by curve B. For other wavelengths, as shown by curve B, the prior art rotator retransmits considerable light in the incident plane, and the amount of such light transmitted is an indication of the ineffectiveness of the rotator for such wavelengths.

With the rotators of the present invention employing a plurality of substantially optically identical plates oriented as described below, plane polarized light passed through these rotator plates is rotated with complete effectiveness for a plurality of wavelengths, and this plurality corresponds to the number of wave plates used. Thus, for my rotator employing two wave plates, as shown by curve C, complete rotation will occur for wavelengths N and P. If three plates are employed, as shown by curve D, wavelengths M, $\lambda_0$ and Q will be rotated with complete effectiveness. For light wavelengths falling between these "nodes" of complete effectiveness, rotation is considerably more effective than that provided by a single half-wave plate rotator, as can be seen by comparing curves C and D with curve B in FIGURE 2. Since the rotation of adjacent wavelengths is so much improved by the rotators of my invention, in comparison with the rotation provided by a single half-wave plate, it can be seen from curve C in FIGURE 2 that the two-plate rotators of my invention are more effective (by an amount on the order of at least 15 times) than previously known rotators. My rotators employing additional plates are even more effective over a range of wavelengths, as indicated by curve D in FIGURE 2.

Because of the greatly improved rotation provided over the entire spectrum of visible light, I call my rotators "achromatic" polarization rotators, since they are not confined to monochromatic polarized light.

Figure 3:
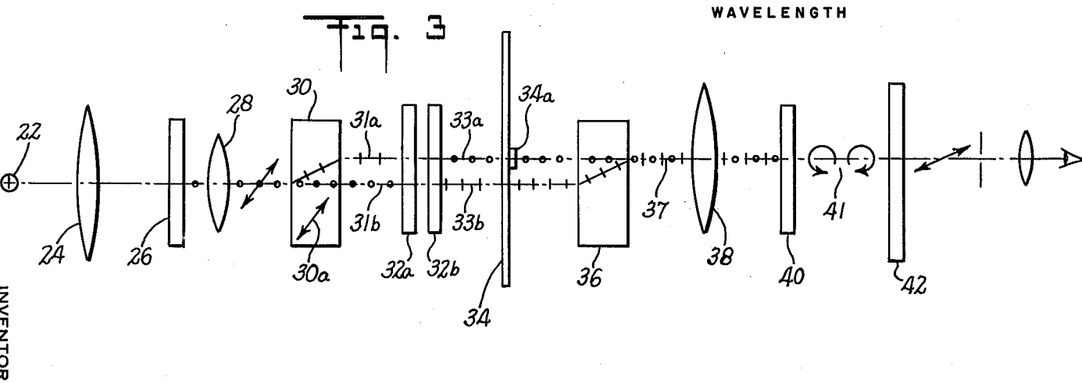
FIGURE 3 is a diagram of an interference microscope embodying one form of my invention, and showing schematically the effect of the various elements upon the light passing through the system.

One important application of my invention is in interference microscopes, such as that described in my co-pending application, Serial No. 706,341, filed December 31, 1957, and particularly those wherein a beam of polarized light must be separated, rotated, and recombined. The application of my present invention to such microscopes is shown in FIGURE 3, which is a schematic diagram of the optical system of an interference microscope as modified to incorporate a rotator utilizing a pair of half-wave plates. Referring to FIGURE 3, the microscope there disclosed employs a single light source 22. A collimator lens 24 forms a beam of parallel rays; a polarizer 26 plane polarizes this beam, and the azimuth of this plane of polarization may be assumed to be at 45° from the vertical plane. The polarizer 26 may be, for instance, a sheet of transparent polarizing material, or a Nicol prism.

For present purposes the single ray or beam of light directed along the optical axis of the instrument may be traced through the system. A condenser 28 focuses this parallel beam from collimator 24 in the plane of a slide 34 on which is placed an object to be studied, 34a. A plate 30, made of birefringent material such as calcite, with its optic axis at about 45° to the plane of the plate as indicated by double arrow 30a, is positioned with its two normal principal axes oriented at an angle of about 45° to the vibration direction or azimuth angle of the incident plane polarized beam, and it has the effect of dividing the incident polarized beam, as described above, into two parallel components beams 31a and 31b, respectively plane polarized parallel to and perpendicular to the plane of the paper, on which FIGURE 3 appears. These two component beams pass through the rotator, here consisting of two substantially identical wave plates 32a and 32b, oriented as described in detail below, whereby the planes of polarization of both beams are rotated by an angle $\alpha$, here 90°. The rotated upper beam 33a, now polarized perpendicular to the paper, passes through slide 34 and object 34a, while the rotated lower beam 33b, now polarized parallel to the paper, passes only through slide 34, and not through specimen 34a. Both beams then pass through a second birefringent plate 36, and if plate 36 is identical to plate 30, and similarly oriented, the two parallel component beams are recombined into beam 37 because their respective planes of polarization have been transposed by the action of the 90° rotator.

It will be seen that the two divided and reunited component beams have traveled optical paths of the same length, except that the upper beam passed through object 34a while the lower beam did not. Therefore, any phase difference between the two beams is attributable only to the object 34a, and by measuring and calibrating this phase difference, the thickness, solution concentration, or optical qualities of the specimen 34a may be determined.

The two reunited superimposed beams 37 are focused by an objective lens 38 and passed through a compensator 40, a quarter-wave plate which converts them to superimposed, counter-rotating, circularly polarized beams 41. These are synthesized by an analyzer 42 into a single plane polarized beam, and the azimuth of this final plane of polarization may be determined by rotatably adjusting the analyzer 42 for minimum brightness by visual or photocell comparison. This azimuth angle will vary in direct proportion to the phase retardation caused by the specimen 34a.

One primary advantage of my rotator using a plurality of substantially identical wave plates in the interference microscope is the availability of a plurality of light wavelengths for which the rotator is completely effective. Thus, the instrument can be used on specimens which strongly absorb light of one of the working wavelengths. Also, when the optical path of light through the specimen is greater than one wavelength, ambiguous thickness determinations may result when only one light wavelength is employed, but such ambiguities are easily resolved when measurements at two or more wavelengths can be made. Furthermore, the effectiveness of these multiplate rotators over a range of light wavelengths permits the instrument to be used with polychromatic or white light illumination, thus making it possible to measure specimens less transparent and thicker than could heretofore be measured.

The orientation of the elements of my achromatic rotators is shown schematically in the charts of FIGURES 6, 7, 8 and 9, the desired rotation angle $\alpha$ between the incident and emergent planes of polarization being shown as 90° in each of these charts.

Figure 6:
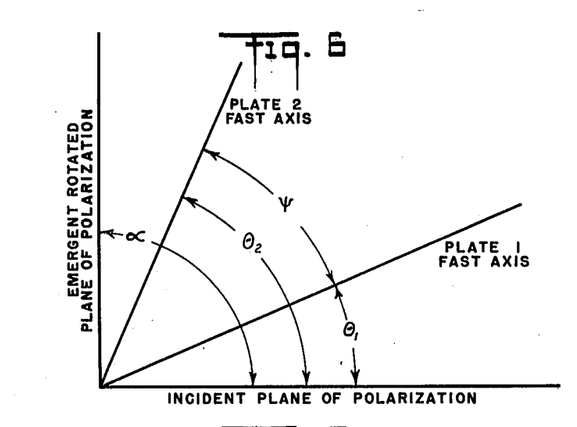
FIGURE 6 is a chart showing the orientation of the "fast" axes of the wave plates in an embodiment of the invention incorporating two wave plates.

FIGURE 6 shows the orientation of the elements of one of my rotators incorporating two substantially optically identical birefringent rotator plates of the same retardation, namely 180° at a wavelength $\lambda_0$ near the center of the spectral region of interest.

In the two-plate rotator of my invention, the fast axis of the second plate is set at an angle $\psi$ with respect to the fast axis of the first, $\psi$ being chosen to be slightly less than one-half of the desired rotation angle $\alpha$. Thus for a 90° rotator, a typical value of $\psi$ would be 43°. The combination is then set so that the fast axis of the first plate is at an angle of $\theta_1 = \frac{1}{2}(\alpha - \psi)$ with respect to the incident plane of polarization.

If the orientation angles of the fast axes of the two wave plates with respect to the incident plane of polarization are called $\theta_1$ and $\theta_2$ respectively, these angles may be expressed in terms of $\alpha$, the desired angle of rotation, as follows:

$$\theta_1 = \frac{\alpha}{4} + \delta = \frac{1}{4}(90°) + 1° = 23.5°$$

$$\theta_2 = \frac{3\alpha}{4} - \delta = \frac{3}{4}(90°) - 1° = 66.5°$$

Here $\alpha = 90°$, and $\delta = 1°$, and $\psi = 43°$ as stated above. The size of the small angle $\delta$ determines the amount of separation between the two wavelengths λ' and λ" for which the combination acts as a perfect 90° rotator.

As shown in FIGURE 6, the angle $\psi$, or $\theta_2-\theta_1$, between the fast axes of the two plates is approximately symmetrically positioned between the incident and emergent planes of polarization, and therefore $\alpha-\theta_2 \cong \theta_1$.

Once the material of which the plates are made, the wavelength $\lambda_0$, and the angle $\psi$ are chosen, the wavelengths λ' and λ" for which the combination acts as a 90° rotator are fixed, and these wavelengths correspond to those of the "nodes" N and P in FIGURE 2. For example, if the birefrigent material has zero or negliggible dispersion of birefringence, if $\lambda_0$ is .546μ and if $\psi=43°$, then $\theta_1=23.5°$ and $\theta_2=66.5°$; for this arrangement, λ' equals .469μ and λ" equals .654μ. If the dispersion of birefringence is not negligible, the wavelengths λ' and λ" will merely be shifted slightly, and the combination will still be achromatic.

If the angle $\psi$ is changed and $\theta_1$ and $\theta_2$ are changed accordingly, the effect is to shift the wavelengths λ' and λ" at which 90° rotation occurs. For example, if $\psi=44°$ and $\theta_1=23°$, and if $\lambda_0=.546\mu$ then $\lambda'=.489\mu$ and $\lambda''=.619\mu$. The range of achromatization is thus reduced, but the degree of achromatization is greater for wavelengths between λ' and λ". The wavelengths λ' and λ" can be determined theoretically by means of the Poincare sphere. See Jerrard, "Transmission of Light Through Birefringent and Optically Active Media: The Poincare Sphere," 44 J. Opt. Soc. Am. 634 (1954).

Additional features and advantages of the two half-wave plate rotators of the invention follow from the above remarks. For example, one advantage of the invention is important in situations where one wishes to rotate the plane of polarization by an amount different from 90°. If the desired rotation is $\alpha$, then we may set $$\psi \leq \frac{\alpha}{2} \text{ and } \theta_1 = \frac{1}{2}(\alpha-\psi)$$

The selection of $\psi$ determines the range of achromatization, as shown above. Thus, if $$\psi < \frac{\alpha}{2}$$

then the two-element combination acts as a rotator for two different wavelengths λ' and λ". If $$\psi = \frac{\alpha}{2}$$

the two wavelengths λ' and λ" coalesce to the central wavelength $\lambda_0$, which is then the only wavelength to receive the proper rotation. If $$\psi > \frac{\alpha}{2}$$

there are no wavelengths which receive the desired complete rotation.

The invention is also useful where it is desired to rotate the plane of polarization of a particular wavelength $\lambda_1$ by exactly $\alpha$. If there are available two substantially identical wave-plates such that their retardation $\phi(\lambda_1) \geq 90°$, then the angles $\psi$ and $\theta_1$ can be selected so that the combination performs as desired.

Furthermore, an adjustable rotator adapted to produce a variable amount of rotation $\alpha$ may be constructed utilizing the principles of this invention. By turning the first and second plates with a particular constant ratio between the angle of plate 2 and the angle of plate 1, the plane of polarization of the emerging beam can be made to turn. For example, if $$\psi = \frac{\alpha}{2}$$

and if the ratio $$\frac{\theta_2}{\theta_1} = 3$$

is maintained, that is, the second plate is turned at three times the rate of the first plate, the emerging plane of polarization will turn at four times the rate of the first plate. For this case, where $\delta=0$, there is only one wavelength $\lambda_0$ at which the combination rotates the plane of polarization exactly $\alpha$. At nearby wavelengths the performance is very good.

In order to make this adjustable embodiment achromatic, that is, to rotate the plane of polariation by $\alpha$ at λ' and λ", we may assure that $$\psi < \frac{\alpha}{2}$$

by turning the two plates at a rotation ratio slightly less than 3 to 1. Thus if $$\theta_1 = \frac{\alpha}{4} + \delta$$

and $$\theta_2 = \frac{3\alpha}{4} - \delta$$

the ratio $$\frac{\theta_2}{\theta_1} = \frac{3\alpha-4\delta}{\alpha+4\delta}$$

Since $\delta$ is a small angle, this ratio will be slightly less than 3 to 1, and as stated above the magnitude of $\delta$ determines the separation of the wavelengths λ' and λ" at which the desired rotation will occur.

Figure 5:
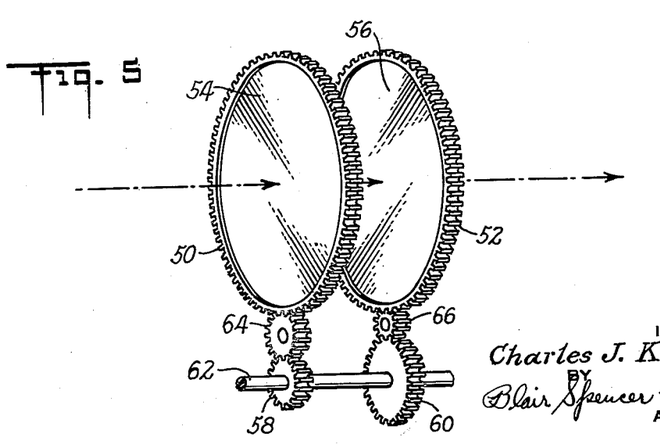
FIGURE 5 is a schematic perspective diagram of one embodiment of the invention providing continuously changing amounts of rotation.

Mechanical means may be provided for turning the first and second plates at the desired different rates. As shown in FIGURE 5, for example, such means may include ring gears 50 and 52 surrounding each of two wave plates 54 and 56 respectively, together with suitable gearing designed to rotate these ring gears by the proper relative increments, such as pinions 58 and 60 driven by rotatable drive shaft 62, with suitable idler gears 64 and 66 to produce the desired different rates of rotation of ring gears 50 and 52. Alternatively, ring gears 50 and 52 may be of different diameters, selected to produce the desired speed of rotation without the use of idler gears 64 and 66.

Such mechanical systems for adjusting the orientation of the plates of my rotators are particularly useful, for instance, in optical systems using plane polarized light and employing light-dividing elements such as "beam-splitters" for separating one beam into two separate beams of light. The characteristics of such light-dividing elements often impose the requirement that the initial plane of polarization of the incident light cannot be adjusted, although such adjustment may be desirable at later points in the system. Thus, in microscopic instruments designed for use with opaque specimens, such as that shown schematically in FIGURE 4, beam 70, plane polarized by polarizer 71, is incident upon beam-splitter 72, which by reflection directs a portion of the illumination through objective 74 onto opaque specimen 76, supported on stage 86. Specimen 76 reflects light back through objective 74, and a portion of this light passes back through beam-splitter 72 and analyzer 78 to eyepiece 80.

Figure 4:
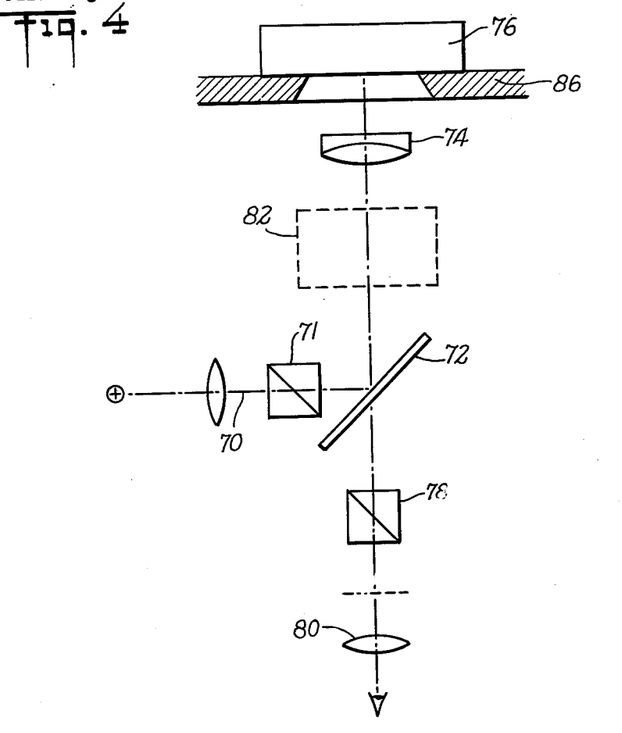
FIGURE 4 is a diagram of a microscopic instrument designed for use with opaque specimens.

The plane of polarization of beam 70 should be either parallel to or perpendicular to its plane of incidence upon beam-splitter 72. Therefore, the plane of polarization of beam 70 cannot be adjusted freely. In order to adjust the plane of polarization of the light incident upon specimen 76 without rotating the specimen or the supporting stage 86, a polarization rotator 82 incorporating a plurality of plates as disclosed hereinabove may be positioned in the illumination beam between the beam-splitter 72 and the specimen 76 and, preferably, between the beam-splitter and the objective 74 since ordinarily more space would be available at this latter location. Adjustment of the components of rotator 82, either individually or simultaneously by suitable means such as the device shown in FIGURE 5, will rotate the plane of polarization incident on the specimen to any desired azimuth angle. Plane polarized light returning from the specimen and again passing through the rotator 82 will be restored by the rotator 82 to its original plane of polarization before reaching beam-splitter 72. The use of my adjustable polarization rotator thus eliminates any necessity for rotating the stage 86 upon which the specimen is supported, and the same portion of the specimen may conveniently be examined under light polarized in a variety of different planes.

Figure 7:
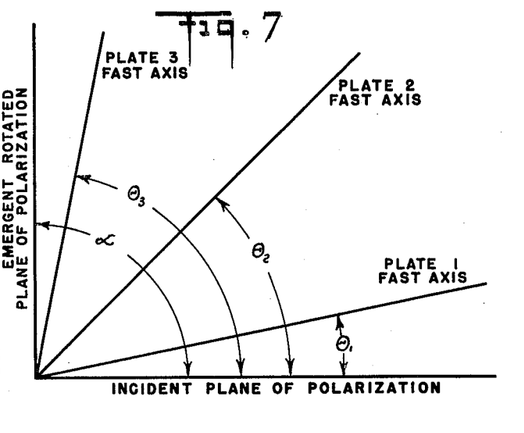
FIGURE 7 is a chart showing the orientation of the fast axes of the wave plates in an embodiment of the invention incorporating three wave plates.

A different embodiment of the invention may be constructed using three substantially optically identical wave plates, with their fast axes oriented as shown schematically in FIGURE 7. Whereas the former combination performed exactly the desired rotation at two wavelengths, $\lambda'$ and $\lambda''$, the three element rotator does so at three wavelengths, $\lambda_0$, $\lambda_1$, and $\lambda_2$, corresponding to the nodes $\lambda_0$, M and Q shown in FIGURE 2.

The plates are selected to provide substantially one-half wavelength retardation at $\lambda_0$, where the wavelength $\lambda_0$ lies somewhere near the center of the region to be achromatized. As shown in FIGURE 7, the fast axis of the first plate is offset by an angle $\theta_1$ from the azimuth of the incident polarization plane. The fast axes of the second and third plates are offset by angles of $\theta_2$ and $\theta_3$ respectively from the azimuth of the incident polarization plane. If the desired rotation, $\alpha$, is 90°, then $$\theta_2 = \frac{\alpha}{2} = 45°$$

and typical values of $\theta_1$ and $\theta_3$ would be 12° and 78° respectively.

The wavelengths for which this combination acts as a 90° rotator are designated as $\lambda_0$, $\lambda_1$, and $\lambda_2$. The wavelength $\lambda_0$ is that for which each plate is substantially a half-wave plate. The wavelengths $\lambda_1$ and $\lambda_2$ can be found from the Poincare sphere when the dispersion of birefringence of the plates is known. Thus, for zero or negligible disperson and for $\lambda_0=.546\mu$, $\lambda_1=.444\mu$, and $\lambda_2=.710\mu$.

The region of achromatization can be changed by varying $\theta_1$ and $\theta_3$ slightly. For example, if $\theta_1=11.5°$, $\theta_3=78.5°$ (and $\theta_2=45°$ as before), then for $\lambda_0=.546\mu$, the wavelengths $\lambda_1$ and $\lambda_2$ are $\lambda_1=.462\mu$ and $\lambda_2=.668\mu$.

As with the two-element rotator, $\theta_1$ and $\theta_3$ can be set to rotate any particular wavelength $\lambda_3$ through exactly $\alpha$, provided that the retardation of each plate at $\lambda_3$ is equal to or greater than 60°.

Also, rotations other than 90° can be accomplished. If the desired rotation is $\alpha$, then the angles $\theta_1$, $\theta_2$ and $\theta_3$ between the fast axes of the three wave plates and the incident plane of polarization may be stated in terms of $\alpha$ as follows:

$$\theta_1 = \frac{\alpha}{8} + \delta$$

$$\theta_2 = \frac{\alpha}{2}$$

$$\theta_3 = \frac{7\alpha}{8} - \delta$$

Here again $\delta$ is a small angle; and its magnitude determines the range of achromatization. The substantially symmetrical arrangement of the fast axes of the three plates between the incident and emergent planes of polarization is apparent in FIGURE 7.

Finally, each of the three plates may be turned at a predetermined rate so that the resulting plane of polarization is turned continuously, as described above with reference to FIGURE 5.

An additional advantage of the three element achromatic rotator has to do with light incident at non-normal angles of incidence. A single half-wave plate has 180° retardation for light incident along a line perpendicular to the surface. For light incident at other angles the retardation is different. Therefore, the single half-wave plate can be used only in a fairly well collimated beam.

The three element achromatic rotator, however, performs its function over a range of angles of incidence. Up to 10° from normal the performance is excellent, and up to 12° it is quite satisfactory. This is roughly twice the angular range obtainable with conventional rotators employing a single half-wave plate. This wide angle feature is desirable in many applications, but especially in the interference microscope.

Other embodiments of my invention can be constructed employing four, five or even more substantially optically identical half-wave plates, with their fast axes properly oriented. Thus, if four half-wave plates are employed to produce a rotation $\alpha$, the fast axes of the plates should be oriented respectively at the following angles from the incident plane of polarization:

$$\theta_1 = \frac{\alpha}{12} + \delta$$

$$\theta_2 = \frac{\alpha}{3}$$

$$\theta_3 = \frac{2\alpha}{3}$$

$$\theta_4 = \frac{11\alpha}{12} - \delta$$

Figure 8:
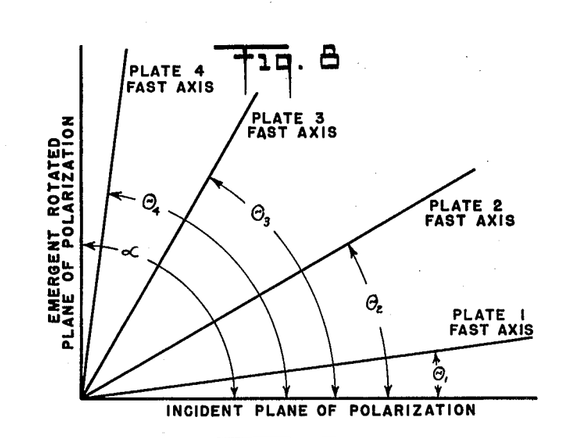
FIGURE 8 is a chart showing the orientation of the wave plates in an embodiment of the invention incorporating four wave plates.

For example, as illustrated in FIGURE 8, if $\alpha$ is chosen as 90° and $\delta$ is chosen as 0.5°, and if the four plates produce one-half wavelength retardation for a wavelength $\lambda_0=0.546\mu$, the combination will rotate the following four light wavelengths by the desired 90°: $\lambda_1=0.325\mu$; $\lambda_2=0.468\mu$; $\lambda_3=0.625\mu$; $\lambda_4=0.768\mu$. As before, $\delta$ is a small angle whose size determines the range of achromatization; for smaller values of $\delta$ the spectral range of achromatization would be decreased, but the degree of achromatization therein would be increased. In practice, $\delta$ would be adjusted for the best performance.

Figure 9:
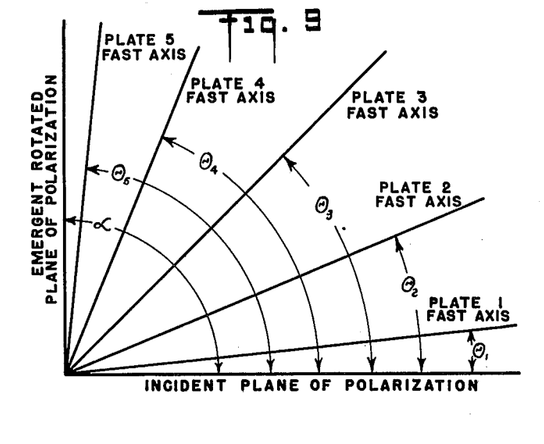
FIGURE 9 is a chart showing the orientation of the wave plates in an embodiment of the invention incorporating five wave plates.

Similarly, if five plates are used to produce a rotation $\alpha$, as shown in FIGURE 9, the fast axes of the plates should be oriented respectively at the following angles from the incident plane of polarization:

$$\theta_1 = \frac{\alpha}{16} + \delta$$

$$\theta_2 = \frac{\alpha}{4} + \epsilon$$

$$\theta_3 = \frac{\alpha}{2}$$

$$\theta_4 = \frac{3\alpha}{4} - \epsilon$$

$$\theta_5 = \frac{15\alpha}{16} - \delta$$

where $\epsilon$ is another small angle comparable to $\delta$. Here, five different wavelengths will all be rotated through the desired rotation angle $\alpha$. In addition, the five-element rotator has an even wider effective angular aperture than the three element rotator discussed above.

While greater numbers of plates could be used, for practical reasons the embodiments described above are believed to be the most useful.

While the plates employed in my rotators are preferably half-wave plates for a wavelength at or near the center of the spectral region of interest, it will be understood that plates retarding such light by odd multiples of a half-wavelength may be used, although their performance at neighboring wavelengths may provide less satisfactory achromatization than plates producing a single half-wavelength retardation for such light.

In addition to the application of the rotators of this invention to the optical apparatus previously discussed, the foregoing advantages of the invention make it useful in a variety of other optical instruments utilizing polarized light. For example, the rotators of the present invention may be used in place of a conventional half-wave plate rotator in the Laurent half-shade device employed with polarimeters and saccharimeters, described in detail in Hardy and Perrin, "Principles of Optics," (McGraw-Hill, 1932 ed.) p. 610. Since conventional half-wave plates are effective only at one wavelength, these devices have heretofore been limited to monochromatic light. My achromatic rotators, on the other hand, permit the use of these instruments with light of any desired band of wavelengths, or with white light.

My achromatic rotators are likewise useful with the Martens photometer, where a rotator covering half of a sheet of transparent polarizing material and rotated to a proper position may replace the conventional Wollaston prism. This arrangement is more economical, and in most cases produces a larger field of view.

Another useful application for the three-element rotator and the five-element rotator is in a wide-angle compensator such as that described by M. Francon and B. Sergent (Compt. Rend. Acad. Sci. Paris 241 27–29 (1955)); Optica Acta 2 182–184 (1955), using a single half-wave plate to turn the plane of polarization by 90°. Not only would my three-element rotator and my five-element rotator have a larger angular aperture than the single plate, but also the rotation would be performed achromatically.

It will thus be seen that the rotators of the present invention provide a number of important and desirable advantages. They make possible interference microscope measurements at various wavelengths. They permit the resolution of ambiguities in determinations of the thickness and optical qualities of specimens which produce retardations of more than one light wavelength. They provide rotation of beams of plane polarized light by predetermined variable amounts. They rotate polarized light incident at a wider range of angles of incidence than has heretofore been possible. Their effectiveness is not limited to monochromatic light, as are conventional rotators; instead they provide complete rotation for a plurality of wavelengths, and greatly improved rotation over the entire spectrum of light wavelengths.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted an illustrative and not in a limiting sense.

It is also to be understood that the following claims are intended to cover all of the generic and specific features of the invention herein described, and all statements of the scope of the invention, which, as a matter of language, might be said to fall therebetween.

I claim:

1. An achromatic rotator for plane polarized light adapted to rotate the plane of polarization of light of a plurality of wave lengths from an incident polarization plane through an angle $\alpha$ to an emergent polarization plane, said rotator comprising, in combination, a plurality of wave plates all providing substantially one-half wave length phase retardation for light of a particular wave length in the spectral region of interest, said wave plates having their fast axes angularly offset by amounts no greater than one-half of the angle $\alpha$ and symmetrically oriented about the bisector of the angle $\alpha$ between the incident and emergent planes of polarization.

2. An achromatic rotator for plane polarized light adapted to rotate the plane of polarization of light of a plurality of wave lengths from an incident polarization plane through an angle $\alpha$ to an emergent polarization plane, said rotator comprising, in combination, an odd plurality of wave plates all providing substantially one-half wave length phase retardation for light of a particular wave length in the spectral region of interest, said wave plates having their fast axes offset by a symmetrical series of angles each no greater than one-half of the angle $\alpha$ and symmetrically oriented about the bisector of the angle $\alpha$ between the incident and emergent planes of polarization, with the central wave plate of said odd plurality having its fast axis bisecting the angle $\alpha$ between the incident and emergent planes of polarization.

3. An achromatic rotator for plane polarized light adapted to rotate the plane of polarization of light of a plurality of wave lengths from an incident polarization plane through an angle $\alpha$ to an emergent polarization plane, said rotator comprising, in combination, a plurality of three or more wave plates all providing substantially one-half wave length phase retardation for light of a particular central wave length in the spectral region of interest, said wave plates having their fast axes offset by a symmetrical series of angles each no greater than ⅜ of the angle $\alpha$ and symmetrically oriented about the bisector of the angle between the incident and emergent planes of polarization.

4. An achromatic rotator for plane polarized light adapted to rotate the plane of polarization of light of a plurality of wave lengths from an incident polarization plane through an angle $\alpha$ to an emergent polarization plane, said rotator comprising, in combination, a plurality of wave plates all providing substantially one-half wave length phase retardation for light of a particular central wave length in the spectral region of interest, said wave plates having their fast axes angularly offset by amounts no greater than one-half of the angle $\alpha$ and symmetrically oriented about the bisector of the angle $\alpha$ between the incident and emergent planes of polarization, whereby said rotator is adapted to rotate said plane of polarization of said plurality of wave lengths simultaneously by a predetermined angular amount, at least two of said plurality of wave lengths being different from said central wave length.

5. In optical apparatus employing plane polarized light, an achromatic rotator for altering the light passing therethrough so that the plane of polarization of the light emerging therefrom will be rotated with respect to the plane of polarization of the light incident thereupon, comprising in combination two substantially optically identical wave plates of birefringent material, each of said plates having a fast axis and a slow axis and providing one-half wavelength phase retardation for a central wavelength in the spectral region of interest, in which the incident plane of polarization of said light and the fast axes of each of said plates are all angularly offset from each other, the angle between the fast axes of said plates being no greater than one-half the total angle of rotation desired.

6. The combination of claim 5 in which the angle between the fast axes of said plates is approximately equal to 43°, while the first of said plates to receive said light has its fast axis oriented at an angle of approximately 23.5° from the incident plane of polarization of said light, whereby said incident plane of polarization is rotated approximately 90° for two wavelengths.

7. In optical apparatus employing plane polarized light, an achromatic rotator for altering the light passing therethrough so that the plane of polarization of the light emerging therefrom will be rotated with respect to the plane of polarization of the light incident thereupon, comprising in combination three substantially optically identical wave plates of birefringent material, each of said plates having a fast axis and a slow axis and providing one-half wavelength phase retardation for a central wavelength in the spectral region of interest, in which the incident plane of polarization of said light and the fast axes of each of said plates are all angularly offset from each other, the angles between said plates being no greater than three-eighths of the total angle of rotation desired.

8. The combination of claim 7 in which the fast axes of said plates are angularly offset from each other by angles approximately equal to 33° while the first of said plates to receive said light has its fast axis oriented at an angle of substantially 12° from the incident plane of polarization of said light, whereby said incident plane of polarization is rotated approximately 90° for three wavelengths.

9. In optical apparatus employing plane polarized light, an achromatic rotator for rotating the plane of polarization of the light emerging therefrom by an angle α with respect to the plane of polarization of the light incident thereupon, comprising in combination four substantially optically identical wave plates of birefringent material, each of said plates having a fast axis and a slow axis and providing one-half wavelength phase retardation for a central wavelength in the spectral region of interest, the fast axes of said plates being angularly offset from the incident plane of polarization by the angular amounts of more than $$\frac{\alpha}{12}, \frac{\alpha}{3}, \frac{2\alpha}{3}$$

and less than $$\frac{11\alpha}{12}$$

respectively.

10. In optical apparatus employing plane polarized light, an achromatic rotator for rotating the plane of polarization of the light emerging therefrom by an angle α with respect to the plane of polarization of the light incident thereupon, comprising in combination five substantially optically identical wave plates of birefringent material, each of said plates having a fast axis and a slow axis and providing one-half wave-length phase retardation for a central wavelength in the spectral region of interest, the fast axes of said plates being angularly offset from the incident plane of polarization by the angular amounts of more than $$\frac{\alpha}{16}$$

more than $$\frac{\alpha}{4}, \frac{\alpha}{2}$$

less than $$\frac{3\alpha}{4}$$

and less than $$\frac{15\alpha}{16}$$

respectively.

11. In an interference microscope for examining a substantially transparent object and employing plane polarized light produced by a single light source and divided into separate beams polarized in different planes, one of said beams being directed to pass through an object located in a focal plane, the improvement comprising an achromatic polarization rotator interposed in the path of both of said beams to rotate their respective incident planes of polarization, said achromatic polarization rotator comprising in combination a plurality of substantially optically identical wave plates of birefringent material, each plate having a fast axis and a slow axis and providing one-half wavelength phase retardation for a central wavelength in the spectral region of interest, the fast axes of said plates being offset with respect to each other by different angles each of which does not exceed one-half the angle between the incident and the emergent planes of polarization of a first of said beams, the fast axes of said plates being symmetrically oriented about the bisector of the angle between the incident and emergent planes of polarization of said first beam.

12. In an interference microscope for examining substantially transparent objects and employing plane polarized light produced by a single light source and divided into separate beams polarized in different planes, one of said beams being directed to pass through said objects located in a focal plane, the improvement comprising an achromatic polarization rotator interposed in the path of both of said beams to rotate their respective incident planes of polarization, said achromatic polarization rotator comprising, in combination, two substantially optically identical wave plates of birefringent material, each of said plates having a fast axis and a slow axis and providing one-half wavelength phase retardation for a central wavelength in the spectral region of interest, the fast axes of said plates being angularly offset by an amount less than one-half the total rotation desired, while the angle formed by said fast axes is substantially symmetrically centered between the incident plane of polarization and the desired emergent plane of polarization of one of said separate beams.

13. The combination of claim 12 in which said plates are so oriented that the angle between the fast axes of said plates is approximately equal to 43°, while the first of said plates to receive said light has its fast axis oriented at an angle of approximately 23.5° from the incident plane of polarization of one of said separate beams.

14. In an interference microscope for examining a substantially transparent object and employing plane polarized light produced by a single light source and divided into separate beams polarized in different planes, one of said beams being directed to pass through an object located in a focal plane, the improvement comprising an achromatic polarization rotator interposed in the path of both of said beams to rotate their respective incident planes of polarization, said achromatic polarization rotator comprising, in combination, three substantially optically identical wave plates of birefringent material, each of said plates having a fast axis and a slow axis and providing one-half wavelength phase retardation for a centrl wavelength in the spectral region of interest the fast axes of said plates being angularly offset from each other by less than three-eighths of the total angle of rotation desired, the fast axis of the second of said plates being oriented at an azimuth approximately half-way between the incident plane of polarization and the desired emergent rotated plane of polarization of one of said beams.

15. The combination of claim 14 in which the fast axes of said plates are angularly offset from each other by angles approximately equal to 33° while the first of said plates to receive said light has its fast axis oriented at an angle of approximately 12° from the incident plane of polarization of one of said beams.

16. In polarizing optical apparatus including a polarizer for providing a beam of plane polarized light for the illumination of an opaque specimen, a semi-transparent beam splitter positioned to receive said beam of polarized light and direct at least a part of said beam along a predetermined optical axis toward said opaque specimen, and an objective between said beam splitter and said specimen for focusing the light received thereby upon said specimen, said objective being arranged to form an image of said specimen at an image plane in conjugate relation thereto, the combination of a plurality of substantially identical wave plates together comprising an achromatic polarization rotator and each formed of birefringent material disposed in said beam between said semi-transparent beam splitter and said specimen, each of said wave plates providing substantially the same predetermined phase retardation of one-half wavelength at a given wavelength to light transmitted thereby, the fast axes of each of said wave plates being angularly adjustable about said optical axis to assume variable angular offsets each of which does not exceed one-half the total rotation angle α, said angle α being measured between the plane of polarization of the light returning from said objective and incident on said plurality of wave plates and the plane of polarization of the light emerging from said plurality of wave plates toward said beam splitter, said fast axes of said wave plates being arranged symmetrically about the bisector of said rotation angle α, and an analyzer in optical alignment with said objective, said plurality of wave plates and said semi-transparent beam splitter so as to receive light reflected by said specimen, said analyzer being adapted to be angularly moved into various positions of adjustment relative to the beam received thereby.

17. In optical apparatus employing plane polarized light, an adjustable achromatic rotator for said light comprising the combination of a plurality of substantially optically identical wave plates of birefringent material, each of said plates having a fast axis and a slow axis and providing one-half wave length phase retardation for a selected wave length in the spectral region of interest, and means for simultaneously rotating each of said plates at different predetermined angular rates while maintaining their fast axes angularly offset by amounts no greater than one-half the total rotation angle between the incident and emergent planes of polarization and symmetrically oriented about the bisector of said rotation angle, whereby the rotation of the emergent plane of polarization produced by said rotator may be varied.

18. In optical apparatus employing plane polarized light, an adjustable achromatic rotator for said light comprising the combination of a plurality of substantially optically identical wave plates of birefringent material, each of said plates having a fast axis and a slow axis and providing one-half wavelength phase retardation for a central wavelength in the spectral region of interest, each said plate having a ring gear joined to its periphery, and gear means for simultaneously rotating each of said ring gears through different angles of rotation predetermined by the gear ratio of said gear means and selected to maintain the fast axes of said wave plates angularly offset by amounts no greater than one-half the total rotation angle between the incident and emergent planes of polarization and symmetrically oriented about the bisector of said rotation angle, whereby the amount of rotation of the emergent plane of polarization produced by said rotator may be varied.

References Cited in the file of this patent

UNITED STATES PATENTS

| | | |
|---|---|---|
| 1,690,602 | Trivelli | Nov. 6, 1928 |
| 2,169,022 | Chubb | Aug. 8, 1939 |
| 2,254,022 | Whitaker | Aug. 26, 1941 |
| 2,323,059 | Land | June 29, 1943 |
| 2,351,932 | Deckel et al. | June 20, 1944 |
| 2,420,273 | West | May 6, 1947 |
| 2,441,049 | West | May 4, 1948 |
| 2,601,175 | Smith | June 17, 1952 |
| 2,607,272 | Bond | Aug. 19, 1952 |
| 2,616,334 | Zernike | Nov. 4, 1952 |

OTHER REFERENCES

Destriau et al.: "Realisation d'un Quart d'Onde Quasi Achromatique par Juxtaposition de Deux Lames Cjristallines de Meme Nature," Le Journal de Physique et le Radium, Serie 8, Tome 10, February 1949, pages 53–55.

Ser. No. 330,963, Ulffers (A.P.C.), published May 4, 1943.

UNITED STATES PATENT OFFICE

CERTIFICATE OF CORRECTION

Patent No. 3,060,808                                                    October 30, 1962

Charles J. Koester

It is hereby certified that error appears in the above numbered patent requiring correction and that the said Letters Patent should read as corrected below.

Column 5, line 66, for "components" read -- component --; column 7, line 12, for "negliggible" read -- negligible --; column 9, line 38, for "disperson" read -- dispersion --; column 12, line 17, after "angle" insert -- $\alpha$ --; column 14, line 36, for "centrl" read -- central --.

Signed and sealed this 18th day of June 1963.

(SEAL)
Attest:

ERNEST W. SWIDER
Attesting Officer

DAVID L. LADD
Commissioner of Patents